(12) United States Patent
Krohn

(10) Patent No.: US 7,104,741 B2
(45) Date of Patent: Sep. 12, 2006

(54) FASTENING MEANS AND PROCESS FOR ITS MANUFACTURE

(75) Inventor: Burghardt Krohn, Ammersbek (DE)

(73) Assignee: Joh. Friedrich Behrens AG, (DE)

( * ) Notice: Subject to any disclaimer, the term of this patent is extended or adjusted under 35 U.S.C. 154(b) by 0 days.

(21) Appl. No.: 10/352,690

(22) Filed: Jan. 28, 2003

(65) Prior Publication Data

US 2003/0143059 A1    Jul. 31, 2003

(30) Foreign Application Priority Data

Jan. 29, 2002    (DE)    ................. 102 03 282

(51) Int. Cl.
  *F16B 15/00*    (2006.01)
(52) U.S. Cl. ..................... 411/457; 411/920
(58) Field of Classification Search ................ 411/457, 411/476, 920, 921, 443, 458, 460
See application file for complete search history.

(56) References Cited

U.S. PATENT DOCUMENTS

| | | | |
|---|---|---|---|
| 1,039,103 A * | 9/1912 | Coupal | ........................ 411/475 |
| 1,417,818 A | 5/1922 | Frost | |
| 2,153,874 A | 4/1939 | Posnack | |
| 2,376,936 A | 5/1945 | Pfeffer | |
| 2,383,135 A * | 8/1945 | Lang | ........................... 411/461 |
| 2,641,154 A * | 6/1953 | Heller | ........................ 411/448 |
| 3,170,279 A * | 2/1965 | Dubini | ........................... 59/77 |
| 3,969,975 A * | 7/1976 | Krol | ............................ 411/456 |
| 5,667,527 A * | 9/1997 | Cook | .......................... 606/219 |

FOREIGN PATENT DOCUMENTS

| | | |
|---|---|---|
| AT | 207 636 | 7/1959 |
| AT | 207 636 | 2/1960 |
| DE | 19 30 914 | 12/1970 |
| DE | 1930914 | 12/1970 |
| FR | 707 271 | 7/1931 |
| GB | 1 407 510 | 9/1975 |
| JP | 07-238909 A | 9/1995 |
| JP | 0723 8909 | 9/1995 |

* cited by examiner

*Primary Examiner*—William L. Miller
(74) *Attorney, Agent, or Firm*—Peter J. Bilinski

(57) ABSTRACT

The present invention is directed to a fastener device that includes a base portion. At least one shank is coupled to the base portion. The at least one shank includes an end configured to be driven into a material. The at least one shank also includes a weakened shank region disposed between a first adjacent shank region and a second adjacent shank region. The weakened shank region includes a cross-section irregularly weakened with respect to the cross-sections of the first adjacent shank region and the second adjacent shank region.

7 Claims, 2 Drawing Sheets

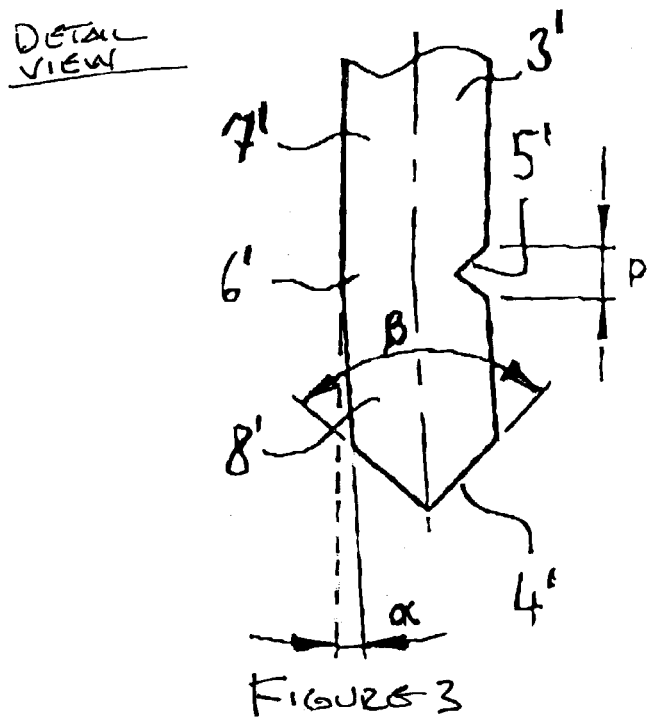
FIGURE 3
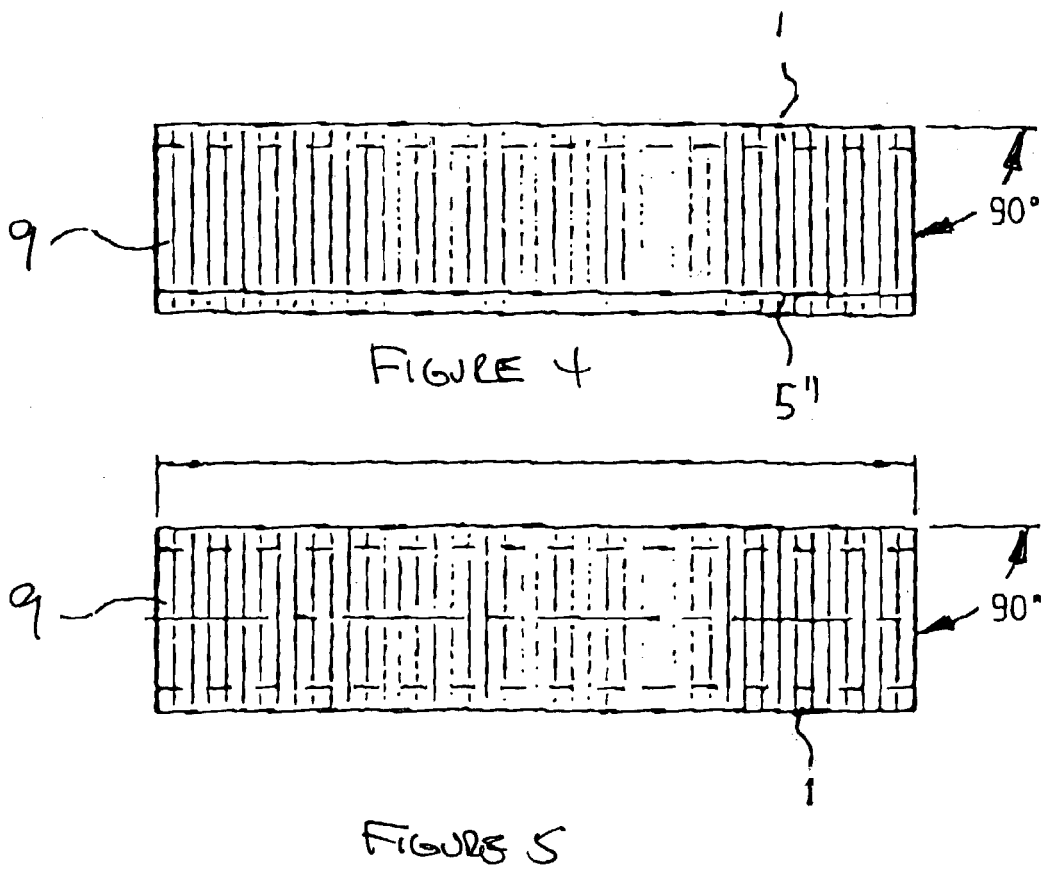
FIGURE 4
FIGURE 5

FASTENING MEANS AND PROCESS FOR ITS MANUFACTURE

BACKGROUND OF THE INVENTION

1. Field of the Invention

The present invention relates generally to fasteners, and particularly to a clip fastener and a process for manufacturing the clip fastener.

2. Technical Background

Fastening clips and/or staples are typically made of a circular or flat wire bent to form a U-shape. In one approach that has been considered, the ends of the legs include a chisel-made chamfered cut. The chamfered cut enables the legs to penetrate the material into which the clips are driven with a straight run. In another approach that has been considered, clips have been made with an out-of-center saw-made chamfer cut at the ends of the legs. As a result, the legs of the clips will extend laterally from the original leg axis, thus increasing the pull-out resistance in many materials.

The clips are manufactured with a saw-made chamfered cut by obliquely shearing off single wires at the ends across an edge, after which a multiplicity of single wires are bent over a shaped body and are collected and, subsequently, are adhered to each other to form a bar made of a multiplicity of clips.

During operation, the clip bars are inserted into a material by means of nail drivers. In many cases, nail drivers are pneumatically operated compressed-air nail drivers. Alternatively, the drivers can be hydraulically operated, gas-fired, electrically operated nail drivers, or hand-operated nail drivers that are spring-loaded.

There are drawbacks to the above described approach. First, the speed of the above described method of producing the clip bars is relatively slow, given that each single wires must be worked individually. As discussed above, fastening clips that have laterally extending legs or shafts when being driven into a material are beneficial. Thus, it would be desirable to increase the productivity and provide a process for the manufacture of the aforementioned fastening clips at an increased production rate.

SUMMARY OF THE INVENTION

The present invention addresses the above described needs. The present invention provides a process for the manufacture of fastening clips at an increased rate of production. The fastening clips produced by the process of the present invention have laterally extending legs or shafts when being driven into a material.

One aspect of the present invention is a fastener device that includes a base portion. At least one shank is coupled to the base portion. The at least one shank includes an end configured to be driven into a material. The at least one shank also includes a weakened shank region disposed between a first adjacent shank region and a second adjacent shank region. The weakened shank region includes a cross-section irregularly weakened with respect to the cross-sections of the first adjacent shank region and the second adjacent shank region.

In another aspect, the present invention includes a process for manufacturing the fastening device. The process includes providing a tape material that has parallel wires aligned in a direction of travel of the tape material. The tape material is divided into plates in a direction transverse to the direction of travel. The tape material or the plates, on at least one side, are provided with weakened cross-sectional lengths extending across the wires or wire portions. The tape material or the plates are provided with at least one angled portion extending across the wires or wire portions.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 3 is a detail view of a leg of the clip depicted in FIG. 1;

FIG. 4 is a side elevation view of a clip bar formed from clips made in accordance with the present invention; and FIG. 5 is a plan view of the clip bar depicted in FIG. 4.

DETAILED DESCRIPTION

Figure 1:
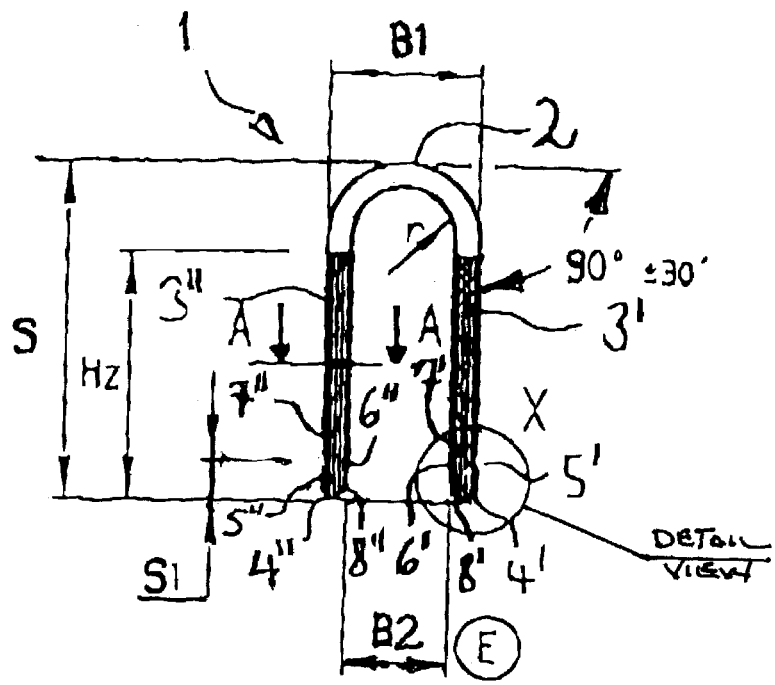
FIG. 1 is a side elevation view of a clip in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the fastener clip of the present invention is shown in FIG. 1, and is designated generally throughout by reference numeral 1.

In accordance with the invention, the present invention for a fastener device includes a base portion and at least one shank coupled to the base portion. The at least one shank includes an end configured to be driven into a material. The at least one shank also includes a weakened shank region disposed between a first adjacent shank region and a second adjacent shank region. The weakened shank region includes a cross-section irregularly weakened with respect to the cross-sections of the first adjacent shank region and the second adjacent shank region. The present invention includes a process for the manufacture of the above described fastening clips at an increased rate of production. The fastening clips produced by the process of the present invention have laterally extending legs or shafts when being driven into a material.

As embodied herein, and depicted in FIG. 1, a side elevation view of a clip 1 in accordance with the present invention is disclosed. Fastener clip 1 includes a base 2 with two substantially straight shanks, or legs, designated 3', 3" which extend from the base essentially parallel one to the other. Both leg 3" and leg 3" include chamfered ends 4' and 4" respectively. Fastening clip 1 is characterized as having a length S, which varies depending on the application. Leg 3' and leg 3" have a length Hz which is also variable depending on the application. Clip 1 has an outer width B1 and an inner width B2, both of which may vary depending on the application.

In the example shown, base 2 includes a bending radius r. By way of example, the inclusion of a radial base 2 may be useful in an application wherein clip 1 is employed to fix another wire to wood. In other embodiments, base 2 may be of a different shape. For example, base 2 may be rectangular in shape. Those of ordinary skill in the art will recognize that base 2 may employ any suitable shape, depending on the application.

Leg 3' and leg 3" each include indented region 5' and 5" respectively. As shown, indented region 5' and indented region 5" respectively. Indented region 5' and indented region 5" are located a distance S1 from the bottom of each respective leg. The indented regions irregularly weaken the cross-sections of each leg. Preferably, the two legs (3', 3") of clip 1 are formed as a shank in the above described manner to enable both of the legs to contribute to an increase in pull-out resistance and to take a desired run in a material.

The irregularly reduced cross-section and/or the angled portion is formed in the vicinity of an end of the shank by which the fastening means is adapted to be driven into material. This helps achieve a particularly large deflection of the shank. The end of the shank that is adapted to be driven in has a chamfered cut therein to make it easier to penetrate into the material. The chamfered cut, in particular, may be a chisel-made chamfered cut or another chamfered cut which is less expensive in manufacture than is the saw-made chamfered cut.

Figure 2:
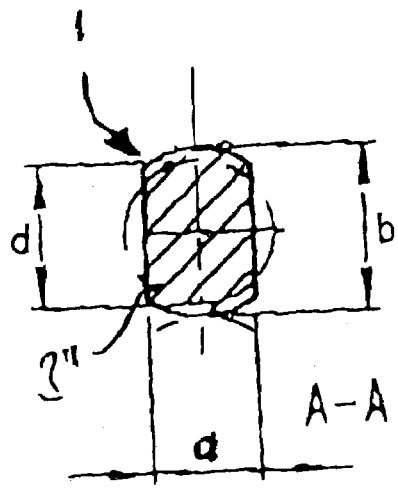
FIG. 2 is a cross-sectional view of the clip taken through line A—A in FIG. 1.

Referring to FIG. 2, a cross-sectional view of the clip taken through line A—A in FIG. 1 is shown. In this embodiment, clip 1 is manufactured by bending a flat wire. Those of ordinary skill in the art will recognize that wire having any suitable cross-sectional shape may be employed.

Referring to FIG. 3, a detail view of a leg of the clip depicted in FIG. 1 is shown. Legs 3', 3" each include a chisel-made chamfer cut 4', 4", respectively. The chamfer cuts 4', 4" are symmetric. The angle of the cut is denoted as angle β. As briefly noted above, legs 3', 3" have indented regions 5', 5" which substantially are V-shaped and open outwardly, at the outsides facing away from each other. The width of aperture p approximately corresponds to the length of the legs of the indented regions 5', 5".

As shown in FIG. 1, indented regions 5', 5" are at a spacing S1 from the chamfered ends 4', 4", i.e. from the tips of the chisel-made chamfer cuts, to be precise. Referring back to FIG. 3, legs 3', 3" have a shank region 6', 6" that has a reduced cross-section relative to the adjacent shank regions 7', 8', and 7", 8" respectively. Further, the portions of the legs 3', 3" are slightly angled to the outside by an angle α. Shank region 8' begins to diverge from shank region 7' at indented region 5'.

During operation, when clip 1 is being driven into a material by a nail driver, the indented regions 5', 5", which are supported by the angled portions 8', 8", cause each of the legs 3', 3" to be deflected outwardly near their ends in the plane of the drawing.

Those of ordinary skill in the art will recognize that the weakened lengths of the cross-section and/or the angled portions may be disposed on different sides of different legs. In another embodiment, the weakened lengths of the cross-section and/or angled portions exist on opposed sides of the two legs to deflect them in opposed directions. In yet another embodiment, the weakened lengths and/or angled portions exist on sides which face each other to direct the legs towards each other. Finally, according to yet another embodiment, the weakened lengths and/or angled portions exist on sides which are equally directed to guide the legs to the same direction. The latter is of interest, for example, in fastening glass strips as is described in DE 93 01 232 U1. Each of these embodiments considerably increases the pull-out resistance of clip 1.

It has been determined that the fastening means, when being driven into the material, extends laterally with respect to the drive-in axis because the cross-section of the shank region is irregularly weakened. By irregularly weakened, it is meant that the cross-section of the shank region is weakened at one side of the shaft, but is not at the opposite side, or that it is weakened more towards one side of the shank than it is towards the opposite side. The consequence is that the shank, when being driven into the material, extends towards the side at which it is weakened or at which it is weakened more. This helps achieve the desired increase in pull-out resistance. Also, this makes it possible to give the fastening means a desired run in a material that can be desirable with regard to a specific construction. The irregularly weakened length of the cross-section in a shank region which is ad-joined by shank portions on both of the sides has technical advantages in production with respect to the known saw-made chamfer cut which allows to achieve significantly higher production speeds and cost reductions.

It has also been determined that the fastening means, when being driven into the material, extends laterally with respect to the drive-in axis because of the angled portion. An angled portion signifies a shank region which encloses an angle with the axis extending through the adjacent shank portion. The consequence is that the shank, when being driven into the material, extends towards the side from which the shank portion which enters first is angled with respect to the shank portion which follows after it. This also helps achieve the desired increase in pull-out resistance. Also, this makes it possible to give the fastening means a desired run in a material that can be desirable with regard to a specific construction. Fastening means having an angled portion can be manufactured at an increased productivity.

Those of ordinary skill in the art will recognize that clip 1 may be produced with either the irregularly weakened cross-section or the angled portion. However, it may be particularly advantageous for the fastening means to have both the irregularly weakened cross-section and the angled portion. It is preferred that the angled portion be directed towards the side at which the weakened length of the cross-section is located. The angled portion advantageously supports the lateral run of the shank, while being driven in, towards the side where the weakened length of the cross-section is located.

EXAMPLE

The invention will be further clarified by the following example which is intended to be exemplary of the invention. In one embodiment, the configuration depicted in FIGS. 1–3 is characterized by the following measurements:

Thickness of the rolled wire a=1.44 mm
Width of the rolled wire b=1.57 mm
Bending radius r=3.225 mm
Height of embossed point S1=2.5 mm
Chiseled angle β=90°
Bending angle of the angled portion α=1°
Width of embossed point p=0.6 mm
Height of clip S=19 mm
External back width B1=9.3 mm Internal back width B2=6.45 mm It is noted that angled portion α may have an angle between 1° to 7°. In another embodiment, angled portion α may have an angle between 3° to 5°. An angle of about 4° is particularly advantageous. Typically, the angled portion extends from the shank region having an irregularly reduced cross-section. This is particularly advantageous in producing the irregularly reduced cross-section and the angled portion. These may be produced in a single working process.

According to an aspect, the end of the shank that is adapted to be driven in is stamped. Stamping enables the proper length of the shank to be cut from an endless material in a single operation and to be provided with a chamfered cut at the end adapted to be driven in. This also favors high productivity.

In another embodiment of the present invention, fastening clip 1 is a nail (e.g. a round-headed nail, T-headed nail or countersunk-head nail) or a pin. The deflection of the shank from the drive-in axis is also advantageous in many applications of nails and pins. In this embodiment, base 2 is the portion of fastening clip 1 opposed to the portion being driven into the material. For example, if fastening clip 1 is a nail, base 2 corresponds to the head of the nail.

As embodied herein, and depicted in FIG. 4, a side elevation view of a clip bar formed from clips made in accordance with the present invention is disclosed. Referring to FIG. 5, a plan view of the clip bar depicted in FIG. 4 is shown. In FIGS. 4 and 5, a multiplicity of clips 1 are combined to form a bar 9. They are held together by an adhesive so that a drive-in apparatus may shear single clips off the bar in order to drive them into a material. In the example depicted in FIG. 4 and FIG. 5, seventy clips 1 are combined to form a bar 9 having a length L of about 74 mm. Those of ordinary skill in the art will recognize that bar 9 may include a multiplicity of clips, nails or pins. Bar 9 affords is advantageous with regard to production and application.

The fastener clip of the present invention is manufactured as follows. A tape material is provided which has parallel wires aligned in the direction of travel of the tape material. The tape material is divided into plates in a direction transverse to the direction of travel. The tape material or the plates, on at least one side, is/are provided with weakened lengths of the cross-section extending across the wires or wire portions. The tape material, or the plates, are provided with at least one angled portion extending across the wires or wire portions. The wires oriented in the direction of travel in the tape material have been combined already, preferably by adhering them. The bars may then be manufactured by simply cutting the tape material into proper lengths transversely to its direction of travel. The plates thus obtained may be utilized, for example, directly as bars comprised of pins or nails. Before or after the tape material is split up into plates, weakened lengths of the cross-section are introduced which extend via the wires of the tape material or the wire portions of the plates on at least one side. In addition or instead, the tape material or the plates are provided with at least one angled portion extending transverse to the wires or wire portions. Since the weakened lengths and/or angled portions are simultaneously introduced into a multiplicity of wires or wire portions another simplification and increase is reached in the speed of the production process.

The plates are bent to form a U-shaped bar from a multiplicity of parallel-disposed, U-shaped clips each of which is made of a wire portion. Hence, a simple further step which relates to a multiplicity of wire portions and clips is used to manufacture a clip bar.

In another embodiment, the plates are separated from the tape material by means of a stamping process. Although the stamping process, which operates with oppositely directed cutting edges, is little suited for the manufacture of heavily angled saw-made chamfered cuts it is well suited for the manufacture of chamfered cuts having a relatively small angle of inclination that improve the penetration of the material. Furthermore, the stamping process is beneficial for particularly high production speeds.

The weakened lengths of the cross-section are created by indenting. The angled portions are produced by bending. The weakened lengths of the cross-section and the angled portions may be produced in a single operation in which the indenting/embossing device causes both the weakened lengths of the cross-section and bends of the tape materials or plates. Preferably, this is accomplished at the same time with cutting the lengths of tape material into plates in the same stamp or embossing device. In another embodiment, two parallel-extending weakened lengths and/or angled portions of the cross-section are worked into each plate in order to produce clips which have two laterally extending legs. In yet another embodiment, the weakened lengths of the cross-section and/or angled portions are worked in near at least one end of the wire portions of the plates in order to achieve a deflection as large as possible of the shank.

The cross-section can be irregularly weakened in various manners. For example, it is basically possible to diminish the strength of the material in some part of the cross-section, e.g. by a thermal treatment on one side (by heat or cold) or another treatment which causes a reduction of material strength. According to a preferred aspect, the irregularly weakened cross-section is a irregularly reduced cross-section. The cross-section, in turn, may be reduced in various manners, e.g. by using a metal-removing working process. According to a preferred aspect, the cross-section is reduced by a deforming process, particularly by making an indented or embossed impression in only one side of the shank.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A fastener device made from wire, said device comprising:
    a base portion and two legs connected to the base portion to form a clip, each of the two legs being formed as a shank; and
    each shank including a chamfered end configured to be driven into a material, and also including a weakened shank region disposed between a first adjacent shank region and a second adjacent shank region, the weakened shank region having a cross-section irregularly weakened with respect to the cross-sections of the first adjacent shank region and the second adjacent shank region, and wherein the second adjacent shank region is coupled to the end adapted to be driven into a material, the entire second adjacent shank region being disposed at an angle with respect to the first adjacent shank region, said angle being preset prior to driving said end into the material, wherein the irregularly weakened cross-section is a cross-section irregularly reduced with respect to the cross-sections of the two adjacent shank regions, said weakened cross-section being reduced by an indented or embossed impression in only an outer side of the shank, wherein the second adjacent shank region directly extends from the weakened shank region having the irregularly reduced cross-section.

2. The fastening device as claimed in claim 1, wherein the angle ($\alpha$) is between 1° to 7°.

3. The fastening device as claimed in claim 2, wherein the angle ($\alpha$) is between 3° to 5°.

4. The fastening device as claimed in claim 1, wherein the end of the shank that is adapted to be driven in is stamped.

5. The fastening device as claimed in claim 1, wherein the weakened shank region is spaced the same distance from the chamfered end on each shank.

6. The fastening device as claimed in claim 1, further comprising a plurality of clips combined into a bar.

7. The fastening device as claimed in claim 6, wherein the clips of the bar are held together by an adhesive.

* * * * *